United States Patent
Beaver

(10) Patent No.: US 11,922,430 B2
(45) Date of Patent: Mar. 5, 2024

(54) SYSTEMS AND METHODS USING BLOCKCHAIN FOR MONITORING AND TRACKING CUSTOMER SERVICE REPRESENTATIVE ACTIONS

(71) Applicant: Verint Americas Inc., Alpharetta, GA (US)

(72) Inventor: Ian Beaver, Spokane, WA (US)

(73) Assignee: Verint Americas Inc., Alpharetta, GA (US)

( * ) Notice: Subject to any disclaimer, the term of this patent is extended or adjusted under 35 U.S.C. 154(b) by 808 days.

(21) Appl. No.: 16/667,034

(22) Filed: Oct. 29, 2019

(65) Prior Publication Data
US 2020/0134638 A1 Apr. 30, 2020

Related U.S. Application Data

(60) Provisional application No. 62/752,547, filed on Oct. 30, 2018.

(51) Int. Cl.
| | |
|---|---|
| *G06Q 30/016* | (2023.01) |
| *G06F 16/182* | (2019.01) |
| *G06F 21/60* | (2013.01) |
| *G06Q 10/0633* | (2023.01) |
| *H04L 9/06* | (2006.01) |

(52) U.S. Cl.
CPC ....... *G06Q 30/016* (2013.01); *G06F 16/1837* (2019.01); *G06F 21/602* (2013.01); *G06Q 10/0633* (2013.01); *H04L 9/0637* (2013.01)

(58) Field of Classification Search
CPC .............. G06Q 30/016; G06Q 10/0633; G06F 16/1837; G06F 21/602; H04L 9/0637
See application file for complete search history.

(56) References Cited

U.S. PATENT DOCUMENTS

| | | |
|---|---|---|
| 9,363,378 B1 | 6/2016 | McDaniel et al. |
| 2015/0310188 A1 | 10/2015 | Ford et al. |
| 2016/0292446 A1* | 10/2016 | Lawrence ................. H04L 9/14 |
| 2017/0005804 A1* | 1/2017 | Zinder .................. H04L 63/123 |
| 2017/0046638 A1 | 2/2017 | Chan et al. |
| 2017/0177898 A1* | 6/2017 | Dillenberger ....... G06F 21/6227 |
| 2018/0131706 A1* | 5/2018 | Anderson ................ H04L 9/32 |

(Continued)

OTHER PUBLICATIONS

Thompson, Stephen. "The preservation of digital signatures on the blockchain." See Also 3 (2017). (Year: 2017).*

(Continued)

*Primary Examiner* — Carrie S Gilkey
(74) *Attorney, Agent, or Firm* — Meunier Carlin & Curfman LLC

(57) ABSTRACT

A system and method using blockchain for monitoring and tracking customer service representative actions are disclosed. In the system and method, customer service representative actions are encrypted using an encryption key specific to a company on whose behalf the customer service representative is acting. The customer service representative signs the encrypted action with a private key of a public/private key pair. The signed, encrypted action record is placed on the blockchain, which can later be accessed to review the actions of the customer service representative or actions of any customer service representative acting on behalf of the specific company.

10 Claims, 2 Drawing Sheets

(56) References Cited

U.S. PATENT DOCUMENTS

2019/0123895 A1\* 4/2019 Blake ................ H04L 67/133
2019/0258999 A1 8/2019 Leonard et al.

OTHER PUBLICATIONS

Cichosz SL, Stausholm MN, Kronborg T, Vestergaard P, Hejlesen O. How to Use Blockchain for Diabetes Health Care Data and Access Management: An Operational Concept. Journal of Diabetes Science and Technology. 2019; 13(2):248-253. doi: 10.1177/1932296818790281 (Year: 2019).\*
Search Report, dated Feb. 20, 2020, received in connection with EP Patent Application No. 19206179.4.
Lobosco, K., "Comcast changes customer name to A-hole on bill," retrieved on Feb. 5, 2020 at https://money.cnn.com/2015/01/29/news/companies/comcast-asshole- bill/index.html, Jan. 29, 2015, 5 pages.
Roy, S., et al., "$QA^{RT}$: A System for Real-Time Holistic Quality Assurance for Contact Center Dialogues," Proceedings of the Thirtieth AAAI Conference on Artificial Intelligence (AAAI-16), 2016, pp. 3768-3775.
D'Aliessi, M., "How Does the Blockchain Work?," OneZero, retrieved on Feb. 5, 2020 at https://medium.com/s/story/how-does-the-blockchain-work-98c8cd01d2ae, Jun. 1, 2016, 16 pages.

\* cited by examiner

SYSTEMS AND METHODS USING BLOCKCHAIN FOR MONITORING AND TRACKING CUSTOMER SERVICE REPRESENTATIVE ACTIONS

CROSS REFERENCE TO RELATED APPLICATIONS

This application is a non-provisional patent application claiming priority to Provisional Patent Application Ser. No. 62/752,547, filed Oct. 30, 2018 which is hereby incorporated by this reference in its entirety as if fully set forth herein.

BACKGROUND

Field

Embodiments of the present invention relate to systems and methods of monitoring actions of customer service representatives (CSR), specifically systems and methods using blockchain technologies for monitoring and tracking actions of CSRs.

Background

Within the contact center environment, there is a need to both monitor the actions and behaviors of customer service representatives (CSRs) and reliably retrieve them if an incident is later surfaced. For example, Comcast has struggled in the past with individual CSR behaviors that have led to viral backlash against the company [1]. After such an incident, an investigation would follow to determine the CSR(s) who performed the actions and if they have performed any similar actions that would require further remediation. Deviant behaviors include failing to be respectful due to personal irritations or motivations, straying from scripted work flows, failing to follow technical and compliance guidelines, continuously taking too long to respond, and many other indicators of poor customer service [2]. Companies commonly outsource contact center work and rely on quality assurance metrics and customer satisfaction surveys to measure the capacity of the third party to provide adequate customer service. As in many of these outsourced contact centers the data associated with individual CSR performance is siloed and not always easily accessible by the hiring companies, they must rely upon the contact center to conduct audits and trust that their methods and reports are acceptable.

BRIEF SUMMARY OF THE DISCLOSURE

Accordingly, the present invention is directed to systems and methods using blockchain for monitoring and tracking customer service representative actions that obviates one or more of the problems due to limitations and disadvantages of the related art.

In an aspect according to principles described herein, a computer product includes computer executable code embodied in a non-transitory computer readable medium that, when executing on one or more computing devices performs a method of using blockchain to track actions of a customer service representative (CSR) on behalf of a company. The method includes digitally encrypting an action of the CSR using a company-specific encryption key to generate an encrypted action; applying a CSR-unique digital private key to the encrypted action; and broadcasting the encrypted action to the blockchain.

In another aspect, the method includes digitally encrypting an action of the CSR using a company-specific encryption key to generate an encrypted action; applying a CSR-unique digital private key to the encrypted action; and broadcasting the encrypted action to the blockchain.

In another aspect, a computer product includes computer executable code embodied in a non-transitory computer readable medium that, when executing on one or more computing devices performs method of tracking records of actions of a customer service representative (CSR) on behalf of a company wherein a record of the CSR's actions are published to a blockchain. The method includes identifying a distributed ledger on the blockchain having records of the CSR among records of other CSRs; decrypting the CSR's records using a company-specific decryption key such that only the CSR's actions for the company are decrypted from among the records in the distributed ledger; and isolating suspicious actions of the CSR from among a plurality of actions of the CSR on behalf of the company.

In another aspect, the method includes identifying a distributed ledger on the blockchain having records of the CSR among records of other CSRs; decrypting the CSR's records using a company-specific decryption key such that only the CSR's actions for the company are decrypted from among the records in the distributed ledger; and isolating suspicious actions of the CSR from among a plurality of actions of the CSR on behalf of the company.

It is to be understood that both the foregoing general description and the following detailed description are exemplary and explanatory only, and are not restrictive of the invention as claimed.

BRIEF DESCRIPTION OF THE DRAWINGS

The accompanying figures, which are incorporated herein and form part of the specification, illustrate systems and methods using blockchain for monitoring and tracking customer service representative actions.

Together with the description, the figures further serve to explain the principles of the systems and methods using blockchain for monitoring and tracking customer service representative actions described herein and thereby enable a person skilled in the pertinent art to make and use the systems and methods using blockchain for monitoring and tracking customer service representative actions.

DETAILED DESCRIPTION

Reference will now be made in detail to embodiments of the systems and methods using blockchain for monitoring and tracking customer service representative actions with reference to the accompanying figures The same reference numbers in different drawings may identify the same or similar elements.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

To combat inaccessibility and distributed storage of CSR records and to speed investigations and audits of CSRs, whether they are direct employees or employees of outsourced companies, we introduce a means to securely decentralize CSR actions using a blockchain [3].

According to principles described herein, each individual CSR is given a unique key pair, consisting of a public and a private key, that will be used to sign all actions that will be broadcast to the blockchain network. In addition, each company that CSR represents is also assigned a unique strong encryption key to encrypt the actions before being placed on the blockchain network. This protects the company related data from being viewed by unauthorized viewers while still allowing for the distribution of the actions themselves on the network. Thus each action by a CSR may be signed by the CSR private key and encrypted using a company-specific encryption key.

In an aspect of the present disclosure, when a CSR performs any action on behalf of a specific company, such as closing an account or changing a customer's information, the action is recorded with a timestamp on the CSR workstation. This action is then encrypted with the company-specific key to prevent unauthorized viewing. Next, the encrypted action is digitally signed using the CSR-specific private key and broadcast on the blockchain network.

A node on the public/private blockchain receives the signed/encrypted message and attempts to decrypt it using the CSR-specific public key. In an exemplary embodiment, each company would have a node on the blockchain network. If the message cannot be decrypted, the network will reject the message as being forged. In this way the network will authenticate that the message containing the action originated from the CSR that performed it. Once the message has been unlocked, the contents (the encrypted action) are recorded in a local ledger of all CSR activity on the network. The message is then placed into the next block of transactions to be added to the blockchain and be verified by additional nodes on the network. This process is visualized in FIG. 1.

Figure 1:
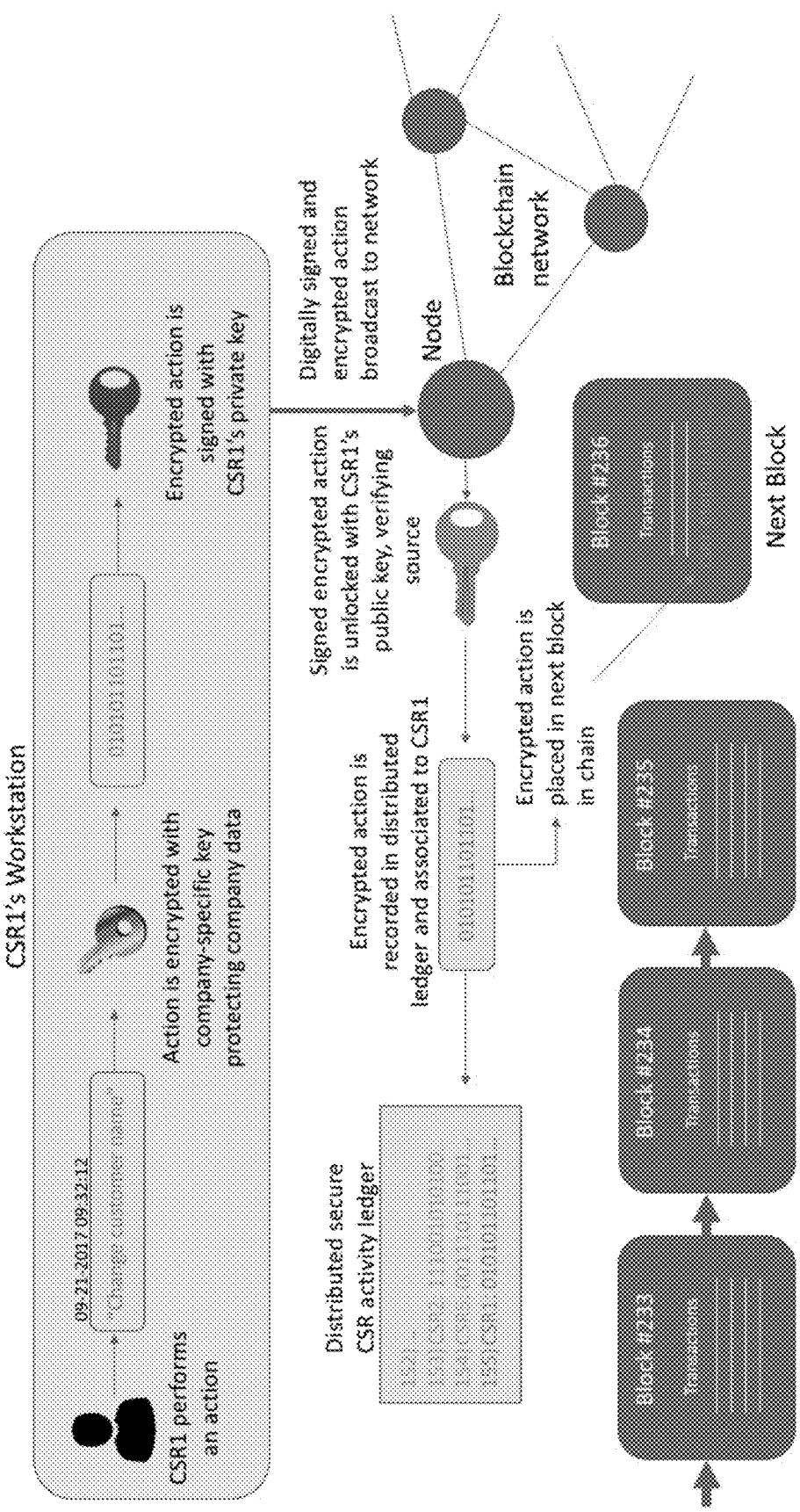
FIG. 1 illustrates recording CSR actions and storing the CSR actions in encrypted form on the blockchain network.

FIG. 1 illustrates recording CSR actions and storing the CSR actions in in encrypted form on the blockchain network. As can be seen in FIG. 1, when a CSR (CSR1) performs an action on behalf of a company (e.g. CompanyA), such as "change customer name", the action is encrypted using CompanyA's company-specific encryption key to protect CompanyA specific data. The CompanyA encrypted action is then signed using CSR1's unique private key. The digitally signed and encrypted action (data) is broadcast to the blockchain network. Actions can be broadcast to the blockchain as they happen, without access to anything besides the CSR's unique private key and the company-specific encryption key. The signed and encrypted action may be unlocked using CSR1's public key to verify the source. The encrypted action may be recorded in a distributed activity ledger an associated with CSR1. The encrypted action may be then placed on the blockchain (in addition to or in place of the prior described broadcast to the blockchain). Thus, a distributed secure activity ledger of CSR1's actions can be maintained using the blockchain network.

If a company wants to audit the performance of all CSRs working on its behalf, it only needs to run a client on the blockchain network and access the ledger of transactions. Using the ledger, the company can query all actions performed by any CSRs on its behalf, regardless of where they are employed. Using their company-specific key they can then decrypt the actions and review all activities that have been performed historically for them by CSRs, regardless of whether the CSR is still employed, or if the company no longer uses the particular customer service third party to handle their accounts. The record of activities is decentralized and immutable on the network preserving all actions, timestamps, and who performed them.

Figure 2:
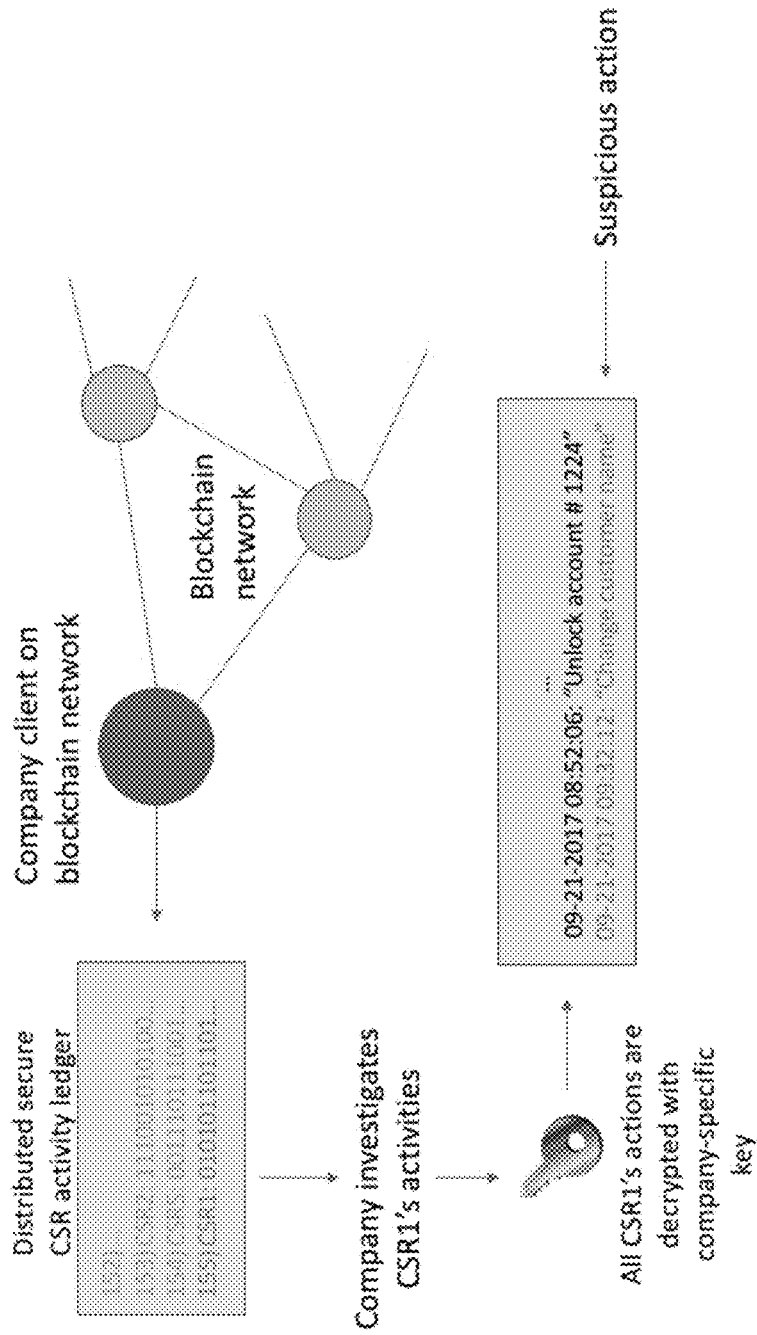
FIG. 2 illustrates how a company can investigate the activities of a CSR representing them without going through the company that employs them, and find any action regardless of how long ago it was performed and if the CSR is still employed

If the company wanted to investigate a particular CSR for example, it could decrypt all of that CSR's actions in the ledger and look for any suspicious activities. Companies may only access their own data. For example, suppose that a CompanyA has received a complaint that CSR1 has changed the name on their account without authorization. In addition, CSR1 works for an outsourced customer service company. The affected company, CompanyA, could look at the history of CSR1's actions without going through the third party, and find the suspicious action. CompanyA could then approach its customer service company and show the evidence, with strong guarantees that the action was in fact performed by CSR1 due to the fact that the network was able to read the message using CSR1's public key. This example is visualized in FIG. 2. FIG. 2 illustrates how a company can investigate the activities of a CSR representing them without going through the company that employs them, and find any action regardless of how long ago it was performed and if the CSR is still employed. As shown in FIG. 2, CompanyA may investigate and decrypt all of CSR1's actions using CompanyA's specific decryption key, thus seeing the specific action taken by the CSR on its behalf (e.g., in FIG. 2, "change customer name"), which may be considered suspicious. The illustrated ledger shows all actions that one specific CSR (e.g. CSR1) has taken over time. In another aspect, the CSR may unlock customer #1224's account if, for example, they forgot their password for example.

As described herein, companies may track the activities of CSRs acting on their behalf and thus track and audit quality and integrity of the activities and the actions. In this way, a company may aggregate data from geographically diverse customer centers and multiple CSRs into a single "chain." The information derived therefrom can thus play a role in maintaining quality interactions with customers. The present system and method uses blockchain technology to allow for decentralization of the information, while allowing the data to be, immutable, protected and verifiable, which is particularly helpful in case there the need for an investigation or disagreement.

That is, the systems and methods provided herein are able to decentralize CSR activities in a company-specific way. Each company recoding actions can determine which actions they want to record on the network, and change those actions at any time. The systems and methods also provide a decentralized, immutable record of actions on a blockchain and a way to audit and investigate CSR actions on behalf of a company without requiring access to outsourced contact center records. The systems and methods provide a way to recall any action that has been performed by any CSR on behalf of a company regardless of where they were employed, their current employment status, and the relationship between the affected company and any outsourced contact center. In addition, according to principles described herein, a third-party can perform an audit of contact center activities without the need to subpoena data or directly involve multiple contact centers. For instance, a company could hire an independent third party or court representative to investigate and simply give them their company-specific key. They would gain access to the entire immutable record of actions performed by all CSRs that ever represented them.

Throughout this application, various publications may have been referenced. The disclosures of these publications in their entireties are hereby incorporated by reference into this application in order to more fully describe the state of the art to which this invention pertains.

[1] Katie Lobosco. Comcast changes customer name to a-hole on bill, Retrieved Sep. 17, 2018. https://money.cnn.com/2015/01/29/news/companies/comcast-asshole-bill/index.html.

[2] Shourya Roy, Ragunathan Mariappan, Sandipan Dandapat, Saurabh Sri-vastava, Sainyam Galhotra, and Balaji Peddamuthu. Qa rt: A system for real-time holistic quality assurance for contact center dialogues. In Thirtieth AAAI Conference on Artificial Intelligence, 2016.

[3] Michele D'Aliessi. How does the blockchain work?, Retrieved Sep. 17, 2018. https://medium.com/s/story/how-does-the-blockchain-work-98c8cd01 d2ae.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

What is claimed is:

1. A non-transitory computer readable medium comprising instructions that, when executed by a processor of a processing system, cause the processing system to perform a method of using blockchain to track actions of one of a plurality of customer service representatives (CSRs), the method comprising:
    each CSR acting on behalf of at least one of a plurality of companies, wherein each company that a CSR represents has a dedicated node on a blockchain network and a company-specific strong encryption key and wherein the CSR has a unique private key;
    at least one of a plurality of CSRs digitally encrypting each action performed on behalf of a respective company of the plurality of companies using a company-specific encryption key for the respective company to generate an electronically encrypted action;
    the at least one of the plurality of CSRs signing the electronically encrypted action by applying a CSR-unique digital private key to the electronically encrypted action, thereby causing the electronically encrypted action to be identifiable to the company for which the action was performed and to the CSR that performed the action; and
    maintaining an electronically distributed secure activity ledger of the CSR's actions using the blockchain network directly traceable to the CSR and to the company by broadcasting the digitally signed and electronically encrypted action to the blockchain network.

2. The non-transitory computer readable medium of claim 1, the method further comprising verifying that the electronically encrypted action originated from the CSR by applying a public key associated with the CSR-unique digital private key.

3. The non-transitory computer readable medium of claim 2, wherein the broadcasting the electronically encrypted action to the blockchain is performed after applying the public key to the electronically encrypted action.

4. The non-transitory computer readable medium of claim 1, wherein the company-specific encryption key is a unique strong encryption key.

5. A method of using blockchain to track actions of one of a plurality of customer service representatives (CSRs), the method comprising:
    each CSR acting on behalf of at least one of a plurality of companies, wherein each company that a CSR represents has a dedicated node on a blockchain network and a company-specific strong encryption key and wherein the CSR has a unique private key;
    at least one of a plurality of CSRs digitally encrypting each action performed on behalf of a respective company of the plurality of companies using a company-specific encryption key for the respective company to generate an electronically encrypted action;
    the at least one of the plurality of CSRs signing the electronically encrypted action by applying a CSR-unique digital private key to the electronically encrypted action, thereby causing the electronically encrypted action to be identifiable to the company for which the action was performed and to the CSR that performed the action; and
    maintaining an electronically distributed secure activity ledger of the CSR's actions using the blockchain network directly traceable to the CSR and to the company by broadcasting the electronically encrypted action to the blockchain.

6. The method of claim 5, further comprising verifying that the electronically encrypted action originated from the CSR by applying a public key associated with the CSR-unique digital private key.

7. The method of claim 6, wherein the broadcasting the electronically encrypted action to the blockchain is performed after applying the public key to the electronically encrypted action.

8. The method of claim 4, wherein the company-specific encryption key is a unique strong encryption key.

9. A non-transitory computer readable medium comprising instructions that, when executed by a processor of a processing system, cause the processing system to perform a method of tracking records of actions of one of a plurality of customer service representatives (CSRs), the method comprising:
    identifying a distributed ledger on a blockchain network having records of the one of the plurality of CSRs among records of other CSRs acting on behalf of at least one of a plurality of companies, wherein each company that a CSR represents has a dedicated node on the blockchain network and a company-specific strong encryption key and wherein each record on the blockchain has been encrypted by the company-specific strong encryption key and signed by a unique CSR-specific private key;
    unlocking the encrypted records by applying a public key paired with the CSR-specific private key;
    associating the encrypted records with the one of the plurality of CSRs in the distributed ledger;
    decrypting the associated records using a company-specific decryption key such that only the actions of the one of the plurality of CSRs for the company are decrypted from among the records in the distributed ledger;
    isolating suspicious actions of the CSR from among a plurality of actions of the CSR on behalf of the company; and
    generating a report indicative of the suspicious actions.

10. A method of tracking records of actions of one of a plurality of customer service representatives (CSRs) wherein a record of the CSR's actions are published to a blockchain network, the method comprising:

identifying a distributed ledger on a blockchain network having records of the one of the plurality of CSRs among records of other CSRs acting on behalf of at least one of a plurality of companies, wherein each company that a CSR represents has a dedicated node on the blockchain network and a company-specific strong encryption key and wherein each record on the blockchain has been encrypted by the company-specific strong encryption key and signed by a unique CSR-specific private key;

unlocking the encrypted records by applying a public key paired with the CSR-specific private key;

associating the encrypted records with the one of the plurality of CSRs in the distributed ledger;

decrypting the associated records using a company-specific decryption key such that only the actions of the one of the plurality of CSRs for the company are decrypted from among the records in the distributed ledger;

isolating suspicious actions of the CSR from among a plurality of actions of the CSR on behalf of the company; and generating a report indicative of the suspicious actions.

* * * * *